United States Patent [19]

Khalil

[11] Patent Number: 5,343,465
[45] Date of Patent: Aug. 30, 1994

[54] METHOD AND SYSTEM FOR REAL-TIME BURSTINESS ANALYSIS OF NETWORK TRAFFIC

[75] Inventor: Khalid M. Khalil, Piscataway, N.J.

[73] Assignee: Bell Communications Research, Inc., Livingston, N.J.

[21] Appl. No.: 75,252

[22] Filed: Jun. 11, 1993

[51] Int. Cl.$^5$ .......................... H04J 3/26; H04L 12/56
[52] U.S. Cl. ........................................ 370/17; 370/94.1
[58] Field of Search ................... 370/17, 60, 94.1, 13, 370/79; 371/20.1

[56] References Cited

U.S. PATENT DOCUMENTS

| | | | |
|---|---|---|---|
| 4,916,694 | 4/1990 | Roth | 370/17 X |
| 5,101,402 | 3/1992 | Chiu et al. | 370/17 |
| 5,260,942 | 11/1993 | Auerbach et al. | 370/17 X |
| 5,280,483 | 1/1994 | Kamoi et al. | 370/60 X |

OTHER PUBLICATIONS

"A Characterization of the Variability of Packet Arrival Processes in Worstation Networks", by Riccardo Gusella, Ph.D. dissertation, Univ. of Cal., Berkeley, 1990.

*Primary Examiner*—Wellington Chin
*Assistant Examiner*—Melvin Marcelo
*Attorney, Agent, or Firm*—Leonard Charles Suchyta; James W. Falk

[57] ABSTRACT

Method, for use with a communications network, for measuring and analyzing the burstiness of network traffic based on the ratio of packet interarrival times. The network traffic includes at least one data burst, and each data burst includes a stream of data packets for travel over the network. The method includes (a) receiving a first data packet of the at least one data burst for travel over the network, the first data packet having an associated first packet interarrival time, and (b) consecutively receiving a second data packet for travel over the network, the second data packet having an associated second packet interarrival time. The method also includes (c) determining the ratio of the second packet interarrival time to the first packet interarrival time and (d) comparing the ratio of the second packet interarrival time and first packet interarrival time to at least one predetermined constant. Lastly, the method includes (e) determining whether the second data packet belongs to the at least one data burst based on the comparison, and (f) accumulating the second data packet with a data burst based on the comparison. A system for carrying out the method is also provided.

10 Claims, 3 Drawing Sheets

METHOD AND SYSTEM FOR REAL-TIME BURSTINESS ANALYSIS OF NETWORK TRAFFIC

TECHNICAL FIELD

The present invention relates to a method and system for burstiness analysis of network traffic.

BACKGROUND ART

Traffic measurements and load characterizations are essential for the analysis and evaluation of network performance and for network design, capacity planning and cost optimization. Network loads can be characterized by identifying key traffic parameters which affect network sizing and performance, such as packet size distribution, packet throughput, and packet interarrival time distribution.

Studies have shown that since the early days of networking data, network traffic tends to be "bursty", rather than evenly distributed over time. Despite this fact, little work has been done to formally define burstiness and to develop models that adequately describe bursty traffic.

Traffic burstiness may be defined as the tendency of data packets to arrive in bursts, with the interpacket arrival time within the burst being much smaller than the average inter-packet arrival time. An appropriate measure of burstiness can serve as an important traffic parameter describing the variability in load intensity and packet arrival rate. Similar measures have been used in other scientific fields to characterize physical phenomena (e.g. errors in communication systems) where the variance in the occurrence of some events is too high to be considered random and when these events tend to occur in clusters.

Bursty traffic can have a significant effect on the queuing delays and response times of the communicating applications, since it can cause momentary capacity overloads from which the network must recover. Extended overloads contribute to network congestion and increase the probability of buffer overruns and discarding packets. Dropping packets to prevent extended overloads affects the quality of services and usually results in degraded performance. This is particularly true in Wide Area Networks (WANs) since the recovery from lost packets is costly in terms of time, generated traffic and processing.

In the past, there was not a great need for bursty traffic analysis. This is because network loads were light, queuing delays were minimal and the processing capabilities of computers limited their ability to admit bursty traffic into the networks. However, the introduction of high speed networking technologies and high performance personal computers and workstations, which are capable of transmitting packets at a very high rate, have increased dramatically the potential variability of network traffic. In addition, distributed systems, such as distributed database and network operating systems that use sophisticated protocols, such as Remote Procedure Call (RPC) and Network File System (NFS), have also contributed to the noticeable increase in traffic burstiness which, in turn, has increased queuing delays and response times. In addition to the variability in network load and packet arrival rates, packets transmitted by these systems are found to be highly correlated in that packets associated with the same application tend to arrive at the same destination over a short time period. This correlation is evident, for example, when a large file is transmitted from a file server to a diskless workstation.

Modeling bursty traffic utilizing traditional traffic or load models, such as a Poisson process, is difficult since the variance of this traffic is higher than that of the Poisson process. Even those models with a higher coefficient of variation, such as Hyperexponential, are still inadequate since they are unable to capture the correlation between packets. Correlation is an important characteristic of data traffic which usually affects the performance of network devices such as packet switches and gateways. Although traditional traffic models assume that packet arrivals are uncorrelated or independent, this assumption is no longer valid.

Few studies have been published describing algorithms and techniques for characterizing the burstiness of real network traffic. Most of the proposed algorithms are for off-line analysis and use iterative or trial-and-error methods to fit model parameters to the observed traffic. Such algorithms, however, are generally not suitable for real-time traffic characterization systems. It is therefore desirable to develop a real-time burstiness analysis capability within traffic characterization and monitoring systems.

SUMMARY OF THE INVENTION

It is therefore an object of the present invention to provide a method and system for on-line real-time traffic burstiness analysis in data communications networks, such as frame relay networks.

In carrying out the above object, and other objects and features of the present invention, there is provided a method, for use with a communications network, for measuring and analyzing the burstiness of network traffic which includes at least one data burst, each data burst including a plurality of data packets travelling over the network, each data packet having an associated interarrival time upon arrival at the network. The method comprises determining a ratio of a first packet interarrival time and a second packet interarrival time, the first packet interarrival time being associated with a first data packet belonging to the at least one data burst, the second packet interarrival time being associated with a second data packet, the data packets consecutively arriving at the network. The method also comprises comparing the ratio of the interarrival times to at least one predetermined constant, and determining whether the second data packet belongs to the at least one data burst based on the comparison.

A system for carrying out the method is also provided.

The advantages accruing to the real-time burstiness analysis of the present invention are numerous. These advantages include, for example, (1) a reduction in system storage requirements, since it is not necessary to store all received packets for further off-line analysis; (2) immediate real-time availability of information from the analysis for administrative and management purposes to identify or alleviate network problems; (3) availability of current usage information when resources (e.g. memory buffers or communication bandwidth) must be allocated to support specific services; and (4) a reduction of dependency on human intervention, allowing for the fully automated future network management systems.

The above object and other objects, features, and advantages of the present invention will be readily ap-

BEST MODE FOR CARRYING OUT THE INVENTION

Figure 1:
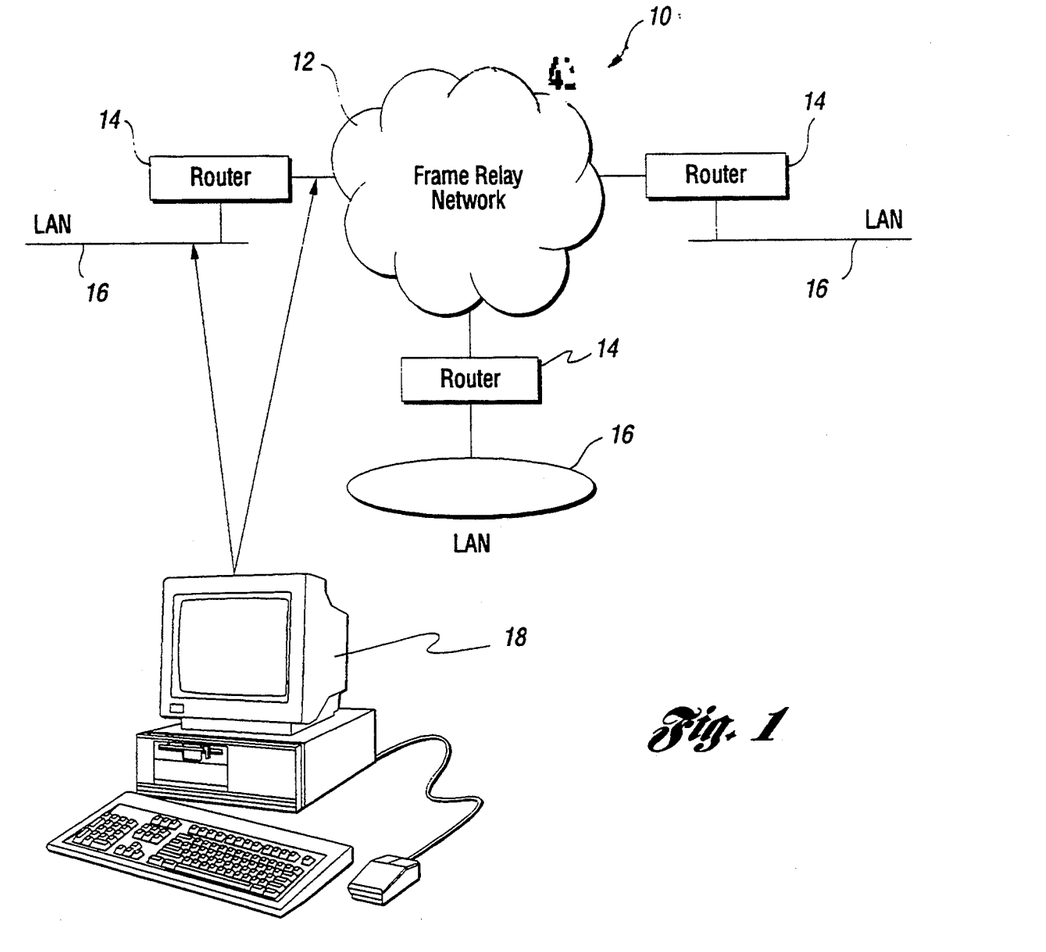
FIG. 1 is an illustration of a network environment, including a network, routers, LANs and a workstation, for use with the methodology of the present invention.

Referring now to FIG. 1, there is illustrated a network environment shown generally by reference numeral 10 for use with the methodology of the present invention. As shown, the network environment 10 includes a network, such as a frame relay network 12, associated routers 14 and LANs 16. In the preferred embodiment, the methodology operates on a workstation 18, such as a Sun workstation.

Frame relay service is a variable bit-rate, connection oriented service currently offered over DS-1 and supports different bit rates, up to 1.5 Mbits per second. Like X.25, Frame relay frame format is based on HDLC, but it has no error or flow control mechanisms. Consequently, frame relay depends on intelligent end-point devices and reliable and clean transmission links. Frame relay provides statistical multiplexing of data, regardless of the type of protocol carried, making it very attractive for bursty applications. As is known, frame relay envelopes data grouping with specific routing and addressing information. The frame structure for frame relay could include, for example, one or more flags, a frame relay header, user information and frame check sequence.

There are several known methods for measuring bursty traffic, such as peak-to-average ratio, coefficient of variation and indexes of dispersion. There have been relatively few models, such as the Packet Trains model and the Markov Modulated Poisson Process (MMPP), proposed to characterize and model bursty traffic.

Burst Measurement Techniques

Peak-to-average ratio is a rather simple measure for representing traffic burstiness. This technique provides a ratio of peak packet rate to the average packet rate, over some specified averaging interval. This technique, however, does not describe trends in network traffic. For example, knowing the peak-to-average ratio does not provide enough information about how frequently these peaks occur, how long they last or whether there is a correlation between them. For these reasons, the present invention does not utilize the peak-to-average ratio burst measurement technique.

The coefficient of variation (C.O.V.) is computed by dividing the standard deviation of either the packet interarrival time, packet rate or the link utilization by the respective mean value. This measure gives more information than peak-to-average ratio about the trends in the traffic, since it represents the deviation from the mean or average rate. It also allows for a relative comparison with standard reference traffic types, such as the deterministic arrival process and the Poisson random arrival process.

The deterministic arrival process is of a limited interest and it exists only on production lines and remote sensor environments where traffic arrives at deterministic interarrival times. The Poisson arrival process has been used extensively to model data traffic and many other physical systems. The C.O.V. has a value of zero for deterministic arrivals and a value of one for Poisson arrivals, while bursty traffic has a C.O.V. greater than one. Although the C.O.V. is suitable for measuring the variation in the data traffic, it is unable to measure the correlation between successive packets. However, for it's simplicity, the present invention utilizes the coefficient of variation measurement technique.

The correlation of the measured traffic can be captured by calculating the variance of the time between n arrivals, and comparing it to n times the variance of successive arrivals. If the arrival times are independent, then the variance of the time between n arrivals will equal the quantity n multiplied by the variance of successive arrivals. If the arrival times are not independent, i.e. correlated, the variance of the time between n arrivals will be greater than the quantity n multiplied by the variance of successive arrivals.

Indexes of dispersion for intervals and counts have been proposed to characterize the burstiness in the packet arrival process. These indexes measure the variance of the sum of n data samples (e.g. intervals and counts) and capture the correlation between these data samples. However, the index of dispersion for an interval for example, is not a simple number, but rather a sequence of values, one for each value of n. The index of dispersion for interval, $J_n$, $n=1,2,...$, is the variance of the sum of n successive intervals normalized by the factor $nE^2(X)$, where $E(X)$ is the common mean:

$$J_n = \frac{VAR(X_{i+1} + \ldots + X_{i+n})}{nE^2(X)}$$

The variance of the sum of n random variables is given by:

$$VAR(X_{i+1} + \ldots + X_{i+n}) = n\,VAR(X) + 2\sum_{j=1}^{n-1}\sum_{k=1}^{j} cov(X_j, X_{j+k})$$

where X is a random variable representing the interarrival time, $VAR(X)$ is the common variance, $cov(X_i, X_j)$ is the covariance, and n is the lag, or distance between samples. As can be seen, the index of dispersion sequence depends on n. Since the interarrival times typically become independent as the lag increases, i.e. as covariance approaches zero, this sequence is expected to reach a limit within a finite value of n. However, non-stationary components in the data may cause this sequence not to reach an asymptote. It has been suggested to use a low-pass filter to smooth the effects of the non-stationary components of the data and a cutoff point was selected allowing only those interarrival times that were less than the cutoff time to be considered.

For off-line analysis when processing and storage resources are available, indexes of dispersion can be very useful to describe the variability in network traffic. However, the complexity of the analysis and the arbitrary selection of vital parameters, such as the sequence length and the cutoff point for smoothing the effect of non-stationary components, make it too complex for real-time traffic characterization systems. In addition, the usability of this technique is limited since it is a sequence of values rather than a single number. For these reasons, the indexes of dispersion technique is not utilized by the present invention.

Burst Modeling Techniques

One technique for modeling burstiness is the Packet Trains model, which uses clustering techniques to capture the dependencies within packet streams and applies those techniques to packet data collected on a ring network. For purposes of this model, trains are sequences of packets that are considered as a unit. They are identified by a single parameter called the inter-car gap. If the inter-packet time exceeds the inter-car gap, then the next packet is considered to be the locomotive (i.e. the new car) of the next train. Otherwise, the next packet is part of the current train. Unfortunately, it appears that the proponents of this model selected the inter-car gap arbitrarily and gave no suggestion as to how to choose this value. In addition, no information is available about the interarrival time distribution of those packets within the train, which depends primarily on the selected value of the inter-car gap. For these reasons, the Packet Train model is not utilized by the present invention.

Another model available for burstiness modeling is the Markov Modulated Poisson Process (MMPP), which has been used to model errors in communication channels. When so used, communication channels are deemed to have a "good" state when the error rate is low and a "bad" state when the error rate is high. Each incursion through the bad state gives rise to a cluster or burst of errors. The transition probabilities from the good to the bad state and vice versa are selected based on the observed properties of the clusters. An extension of this model using multiple hierarchical states instead of two states has been used by others concerned with errors in communication channels.

The MMPP has received a relatively wide acceptance in the communications community as a suitable model to characterize the load on data and integrated services networks. It has been used to characterize the superposition of packetized voice sources and data traffic and show that traffic variability and correlations have a dramatic effect on the voice packet delay distribution. Others have used the 2-state MMPP model to represent the traffic loads on ATM and integrated services networks and show that the performance, in terms of cell loss rate and queuing delays, degrades as traffic burstiness increases.

Burst Analysis

Figure 2:
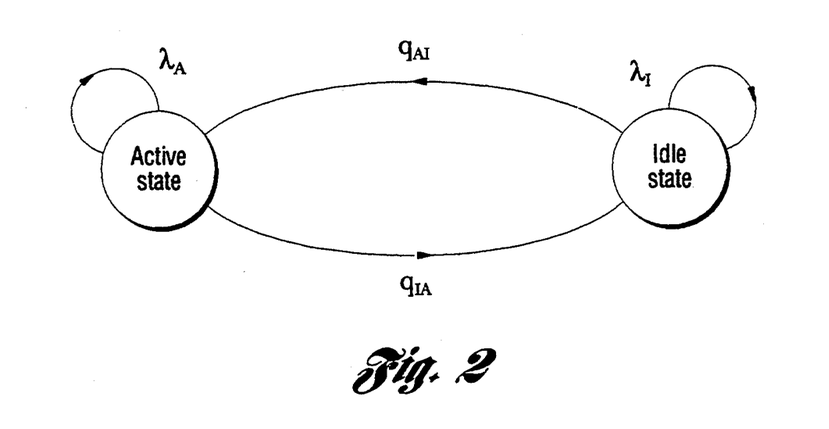
FIG. 2 is an illustration of the Markov-Modulated Poisson process for modeling bursty network traffic for use with the present invention.

Referring now to FIG. 2, there is shown an illustration of a 2-state MMPP for use with the present invention. This MMPP and its use by the present invention are discussed in the article titled "A Real-Time Algorithm for 'Burstiness' Analysis of Network Traffic", presented at ICC '92 and published in the proceedings at pp. 0521–0527, which is hereby expressly incorporated by reference in its entirety. The MMPP may be defined as a doubly stochastic Poisson process whose arrival rate depends on the state of an n-state irreducible continuous-time Markov chain. Generally, when the Markov chain is in state i, the arrival process is Poisson with rate $\lambda_i$.

In the preferred embodiment, the 2-state MMPP includes an inactive state (I) with a low packet arrival rate ($\lambda_I$) and an active state (A) with a high packet arrival rate ($\lambda_A$). This 2-state MMPP is fully specified by four parameters: the two transition rates of the Markov chain, $q_{IA}$ and $q_{AI}$, and the two arrival rates, $\lambda_I$ and $\lambda_A$.

The MMPP shown in FIG. 22 is preferably used to model bursty traffic. The real-time methodology of the present invention has been developed to fit the model parameters to the observed (i.e. measured) traffic. Such capabilities will provide information about the traffic burstiness allowing network administrators to manage the network more effectively and to keep the network performance at an acceptable level. As an example, if the traffic on a specific sub-network is very bursty, then the network administrator may choose to modify the routing tables so as to reduce the traffic on this sub-network and to keep the utilization below a certain threshold, thereby maintaining a short end-to-end response time.

A key issue in a real-time system is determining the cutoff point. The cutoff point determines the threshold in the packet interarrival time that delineates the bursts. Packets arriving below the cutoff point are considered belonging to the current burst. Packets that arrive with interarrival times greater than this threshold are considered to be the beginning of a new burst.

For off-line characterization systems, the cutoff point is selected through the analysis of all the packet interarrival times collected over the measuring period. This process is often repeated several times in a trial-and-error fashion until an acceptable cutoff point is found. Having found this point, other burst characteristics, such as the distribution of the burst interarrival time and the distribution of the burst duration or burst size can be determined.

Designing an on-line, real-time methodology for burstiness analysis like the present invention to characterize the burstiness of the traffic is more of a challenge, since a decision has to be made in real-time to determine whether the arriving packet(s) belong to the current burst or whether the arriving packet(s) represents the first packet of the next burst. For high speed networks, the algorithms developed to identify, detect and analyze bursts are both sophisticated and fast.

The 2-state MMPP model assumes that while it is in a specific state, packets are generated according to an exponential distribution with a mean that depends on the state. Assuming this model and comparing the current packet interarrival time to the previous packet interarrival time, it is possible to decide whether the arrived packet belongs to the current burst (the system still in the same state) or if it is the first packet of a new burst (the system has made a transition to the other state).

If both interarrival times belong to the same exponential distribution, then it can be assumed that both packets belong to the same burst. Otherwise, the current packet is considered to be the beginning of a new burst. This decision is possible, albeit with some degree of uncertainty, using the test of hypothesis technique. In this test, the null hypothesis is that the two interarrival times belong to the same distribution and the alternate hypothesis is either the current packet interarrival time is longer than the previous packet interarrival time, or the current packet interarrival time is shorter than the previous packet interarrival time.

Consider the probability (Pr) that the ratio between two consecutive packet interarrival times drawn from the same exponential distribution is greater than a constant C, where $C \geq 1$. Later, this constant will be used to determine the probability of rejecting the null hypothesis (that these two interarrival times belong to the same distribution) while this hypothesis is true. For purposes of this discussion, this probability is referred to as Type I error. Assuming X is an exponentially distributed random variable that represents packet interarrival time, then:

$$Pr\left(\frac{X_{i+1}}{X_i} \geq C\right) = Pr\{X_{i+1} \geq Cx | X_i = x\} Pr\{X_i = x\}$$

$$= \int_0^\infty \lambda e^{-\lambda x} e^{C\lambda x} dx$$

$$= \left[\frac{-e^{(C+1)\lambda x}}{C+1}\right]_0^\infty$$

$$= \frac{1}{C+1}$$

It is also true that:

$$Pr\left(\frac{X_{i+1}}{X_i} \leq \frac{1}{C}\right) = Pr\{X_{i+1} \leq x/C | X_i = x\} Pr\{X_i = x\}$$

$$= \int_0^\infty (1 - e^{-\lambda x/C}) \lambda e^{\lambda x} dx$$

$$= [-e^{-\lambda x}]_0^\infty - \left[\frac{-e^{-\frac{(C+1)}{C}\lambda x}}{\frac{C+1}{C}}\right]_0^\infty$$

$$= \frac{1}{C+1}$$

By comparing the interarrival time between every two successive packets, a decision can be made as to whether these two packets belong to the same burst. For example, for C=10, there is greater than a 90% chance that a correct decision can be made, and less than a 10% chance of making a wrong decision as to whether the two packets belong to the same burst.

It should be appreciated that to increase confidence in the decision, the constant C can be selected to be very large so as to minimize the probability of making a wrong decision (Type I error). However, it should be noted that increasing the value of the constant C also increases the probability of accepting the hypothesis that the two interarrival times belong to the same distribution (both packets belong to the same burst) even when that hypothesis is wrong and the packets do not belong to the same distribution. For purposes of this discussion, this probability is referred to as Type II error.

Based on the above, these two types of errors seem to be related and minimizing one error increases the other error. To minimize both types of errors and to improve the confidence intervals of this test, the current interarrival time $(X_{i+1})$ is compared to the average of the previous interarrival times of the current burst. Assuming $$A = Pr\left\{\frac{X_{i+1}}{\frac{\Sigma_n X_i}{n}} \geq C\right\}$$

$$B = Pr\left\{\frac{X_{i+1}}{\frac{\Sigma_n X_i}{n}} \leq \frac{1}{C}\right\}$$

the probability of a Type I error when the last n interarrival times are considered may be calculated as:

$$A = Pr\left\{\frac{X_{i+1}}{\frac{\Sigma_n X_i}{n}} \geq C\right\}$$

$$= Pr\left\{X_{i+1} \geq \frac{Cx}{n} | X_i = x\right\} Pr\left\{\sum_n X_i = x\right\}$$

$$= \int_0^\infty e^{-\frac{C\lambda x}{n}} \frac{\lambda^n x^{n-1} e^{-\lambda x}}{(n-1)!} dx$$

$$= \frac{\lambda^n}{(n-1)!} \int_0^\infty x^{n-1} e^{-\lambda(1-\frac{C}{n})x} dx$$

$$= \left(\frac{n}{C+n}\right)^n$$

and $$B = Pr\left\{\frac{X_{i+1}}{\frac{\Sigma_n X_i}{n}} \leq \frac{1}{C}\right\}$$

$$= \frac{(nC+1)^n - (nC)^n}{(nC+1)^n}$$

As the quantity n approaches infinity (i.e. $n \rightarrow \infty$):

$$A = Pr\left\{X_{i+1} \geq C\bar{X} = \frac{C}{\lambda}\right\}$$

$$= e^{-C}$$

and

-continued $$B = Pr\left\{ X_{i+1} \leq \frac{\overline{X}}{C} \right\}$$

$$= 1 - e^{-\frac{1}{C}}$$

From the previous analysis, it can be seen that by considering the history of the arrival process, the confidence interval of the test can be increased. That is, the probability "A" of making a Type I error and rejecting the null hypothesis (while it is correct) in favor of the alternate hypothesis (that the current interarrival time is greater than the average of the previous n interarrival time) can be greatly reduced. However, the probability "B" cannot be reduced at the same rate.

The method of the present invention for on-line traffic burstiness analysis applies the test introduced in the previous section to determine whether the incoming packet belongs to the current burst or starts a new burst. By successive applications of this test at the arrival time of each packet, it is possible to construct a burst profile of the traffic and view the traffic as a series of bursts, rather than a series of packets. Once the burst profile is constructed, other traffic parameters, such as burst size and burst interarrival time, can easily be obtained.

It should be noted that there is reason to implement this algorithm with care. A straight forward implementation of the algorithm may consist of two states: active and idle. Let us assume that the system is in the active state. The system stays in this state as long as it fails to reject the hypothesis that the newly arrived packet has an interarrival time less than or equal to the interarrival time of the active state. If this hypothesis is rejected in favor of the alternative hypothesis that the newly arrived packet has an interarrival time longer than that of the active state, then the system makes a transition from the active state to the idle state delineating the end of the current burst and the start of a new burst.

On the other hand, if the system is in the idle state, it stays in the idle state as long as the null hypothesis (that the newly arrived packet has an interarrival time longer than or equal to the interarrival time of the idle state) is not rejected. The system makes a transition to the active state if this hypothesis is rejected. Thus, a straightforward implementation can have associated disadvantages. For example, the effects of wrong decisions are cumulative, and it is more vulnerable to drifting sequences.

To explain what is meant by a drifting sequence, consider a 2-state MMPP. In state 1, the system accepts interarrival times with mean $1/\lambda_1$, while in state 2, it accepts interarrival times with mean $1/\lambda_2$. The system transitions from state 1 to state 2 when it decides that the new interarrival time exceeds $1/\lambda_1$. Similarly, the system makes a transition from state 2 to state 1 when it decides that the interarrival time is less than $1/\lambda_2$. Some sequences of interarrival times that have an ascending (or descending) order may result in a drifting sequence, where the need to perform a state transition goes undetected and the system fails to reject the hypothesis. Consequently, it starts accepting interarrival times with average interarrival time of $1/\lambda_2$, although it is in state 1. After this sequence, the system most likely stays in one state and assumes that every packet belongs to the current burst.

To avoid drifting sequences and make the system more robust, the implementation must be less sensitive to these drifting sequences, and the effects of wrong decisions should diminish over time. In the preferred embodiment, notions of "bursts" and "clusters" are utilized. For purposes of this discussion, a burst is the collection of packets received with the same average interarrival time and is constructed by accumulating packets while the system is in a certain state, and a cluster is a collection of bursts.

In this implementation, packets are accumulated to form a burst as long as the null hypothesis is not rejected (i.e. as long as packet interarrival times belong to the same distribution). Once the hypothesis is rejected, a second decision is made whether this burst belongs to the current cluster or it starts a new cluster. If the packets within the constructed burst arrive with the same average rate as those of the last received cluster, then the burst is added to the cluster, otherwise, it signifies the end of the previous cluster and the beginning of a new cluster.

During operation, the only input that needs to be provided to the system is the value of the parameter C, which represents the required significance level of the test, i.e. determines the maximum allowable type I error. If the test that compares the current interarrival time to the previous interarrival time is selected, then the value of C will be fixed. However, if the current interarrival time is to be compared to the average of the n previous interarrival times, then the value of C will depend on the current size of the burst. In one embodiment, the value of C is selected as 10 when n=1, and varies inversely with n (i.e. C decreases as n increases), such that the confidence interval of the test stays at approximately 90%.

To validate and test the capabilities of this algorithm to capture (recover) bursts, a bursty traffic was artificially generated according to a 2-state MMPP model and fed to the system. The original and the reconstructed traffic appear in Table I shown below. The generated traffic is characterized by four parameters, $q_{AI}$, $q_{IA}$, $\lambda_1$ and $\lambda_2$. $q_{AI}$ is the transition rate from the active state to the idle state, $q_{IA}$ is the transition rate from the idle state to the active state, and $\lambda_A$ and $\lambda_I$ are the packet arrival rates associated with the active state and the idle state, respectively. For purposes of this test, $\lambda$ is fixed to one and the value of $q_{IA}$ is selected as that of $\lambda_I$, so that the average number of successive packets during the idle state is one. Several traffic loads were generated by changing the values of $q_{A1}$ and $\lambda_1$ and the reconstructed traffic is compared to the original traffic in each case. As shown in Table I, the parameters of the reconstructed traffic are close to those of the original traffic. Even better results could be obtained by further tuning the algorithm.

TABLE I

Burstiness Parameters For The Generated And The Reconstructed Traffic

| Generated Traffic | | | | | Reconstructed Traffic | | | |
|---|---|---|---|---|---|---|---|---|
| $\lambda_1$ | $\lambda_2$ | $q_{12}$ | $q_{21}$ | $\beta$ | $\lambda_1$ | $\lambda_2$ | $q_{12}$ | $q_{21}$ |
| 1.00 | 0.10 | 0.13 | 0.10 | 1.70 | 0.85 | 0.12 | 0.05 | 0.05 |
| 1.00 | 0.10 | 0.06 | 0.10 | 1.71 | 0.86 | 0.12 | 0.03 | 0.05 |
| 1.00 | 0.10 | 0.03 | 0.10 | 1.55 | 0.98 | 0.14 | 0.02 | 0.06 |
| 1.00 | 0.10 | 0.02 | 0.10 | 1.43 | 1.01 | 0.14 | 0.02 | 0.08 |
| 1.00 | 0.01 | 0.13 | 0.01 | 2.64 | 0.28 | 0.01 | 0.02 | 0.01 |
| 1.00 | 0.01 | 0.06 | 0.01 | 3.40 | 0.50 | 0.01 | 0.02 | 0.01 |
| 1.00 | 0.01 | 0.03 | 0.01 | 4.12 | 0.58 | 0.01 | 0.01 | 0.01 |
| 1.00 | 0.01 | 0.02 | 0.01 | 4.79 | 0.81 | 0.01 | 0.01 | 0.01 |

It should be appreciated that the methodology of the present invention can also be used to analyze and characterize the traffic from an operational Xerox Ethernet, which has several file servers and is connected to tens of workstations and personal computers.

Figure 3:
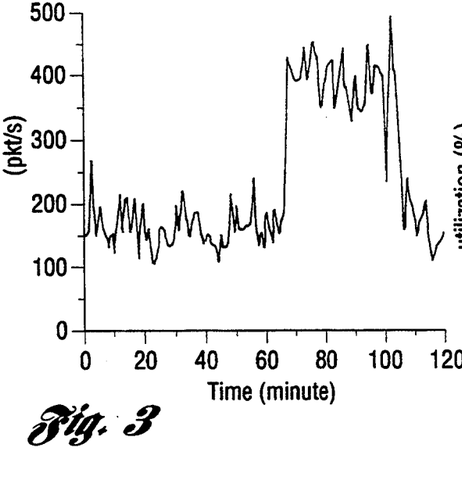
FIG. 3 is a graphical illustration of network throughput versus time for LAN traffic measured and analyzed according to the present invention.
Figure 4:
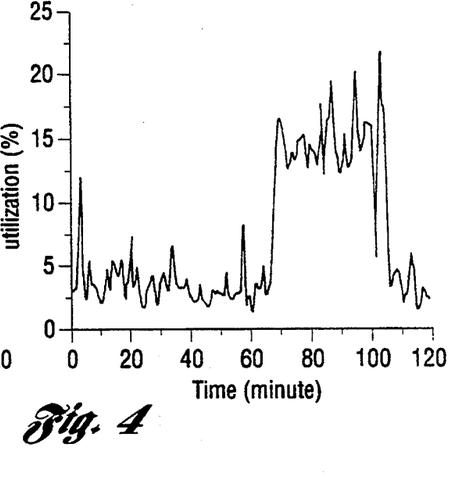
FIG. 4 is a graphical illustration of network utilization versus time for LAN traffic measured and analyzed according to the present invention.

Referring now to FIGS. 3 through 7, one day of the LAN traffic was measured and analyzed. The results of analyzing the LAN traffic measured from 2:00 p.m. to 4:00 p.m. are shown, since these results represent two distinct network states. A low activity state (2:00 p.m.–3:00 p.m.) and a high activity state (3:00 p.m.–4:00 p.m.). FIG. 3 shows network throughput in packets/seconds, where the number of received packets is averaged over a one minute interval. It can be seen from FIG. 3 that network activity, in terms of the number of transmitted packets, during the first hour is low, whereas network activity is almost doubled during the second hour. The same general observation applies for the network utilization. FIG. 4 illustrates that network utilization increased more than 5 times during the second hour. This is due to the large sizes of the transmitted packets.

Figure 5:
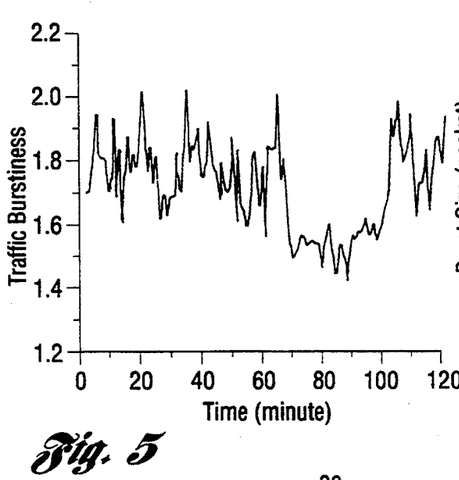
FIG. 5 is a graphical illustration of network traffic burstiness versus time for LAN traffic measured and analyzed according to the present invention.
Figure 6:
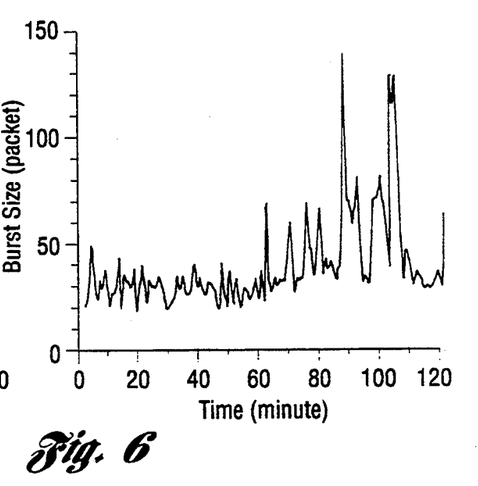
FIG. 6 is a graphical illustration of burst size versus time for LAN traffic measured and analyzed according to the present invention.
Figure 7:
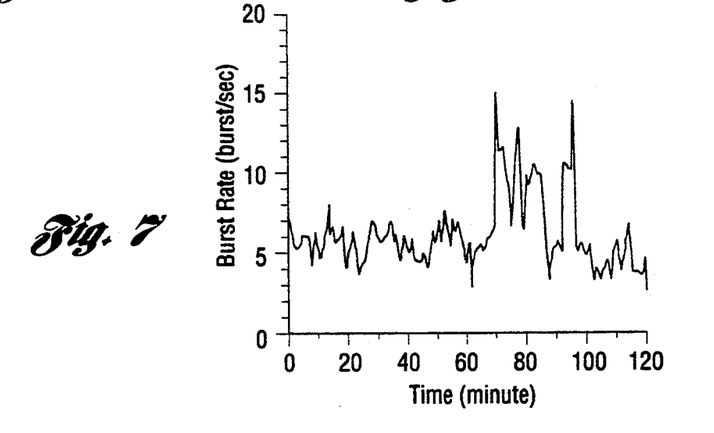
FIG. 7 is a graphical illustration of burst rate versus time for LAN traffic measured and analyzed according to the present invention.

With reference to FIG. 5, the burstiness of the traffic measured during the two hour interval is plotted. Although the traffic is more bursty than the Poisson traffic, it is not considered very bursty. This is because the large number of stations communicating over the same network have a smoothing effect on the generated traffic. Comparing this figure to FIG. 4, it can be seen that, in this environment, when network utilization increases the traffic burstiness decreases. In addition, as shown in FIGS. 6 and 7, the burst size and the burst rate increase as the network utilization increases.

It should be appreciated that the methodology of the present invention allows a user to not only identify the burstiness of a network, but also to identify the "state" (active/inactive) occupied most frequently by the network, thereby allowing the network to be sized. To help design Frame Relay networks, protect the networks against large surges of data traffic, and control the burstiness of the traffic, Frame Relay service providers require each user to provide the needed committed information rate (CIR) for each permanent virtual circuit (PVC), which are part of the frame relay network and interconnect pairs of routers. Which of any number of PVCs a data frame travels along is determined by a connection identifier in the frame relay frame.

The CIR is the rate (bit/sec) at which the network agrees to transfer information under normal conditions and is an average rate measured over a time interval T. The CIR is generally lower than the access rate (the rate at which data frames may be transmitted into the frame relay service network from an access device, such as the router), and is basically a bandwidth allocator, giving the service provider a basis for appropriate provisioning on network trunks. CIR and other important parameters, such as committed burst size ($B_C$), discard eligible (DE), excess burst size ($B_E$), and measurement interval (T), which have to be identified by the user, are hard to measure and a tool is required to measure/calculate/ provide this information.

The $B_C$ is the maximum amount of information in bits that the network agrees to transfer over a specific measurement interval T. The DE is a bit in the Frame Relay frame header that, when set to one, indicates that this frame should be discarded in preference to frames with the DE bit set to zero. The DE bit can be set by an end user device for traffic that should be regarded as "uncommitted", or by the network itself for frames received in excess of the committed burst size. Discard eligibility is a type of enforcement mechanism, such that if the average rate of input into the network on a PVC exceeds the CIR over some specified time interval, the excess is deemed discard eligible.

The excess burst size $B_E$ is the maximum amount of "uncommitted" information in bits in excess of $B_C$ that the network will attempt to deliver over a time interval T. Excess data will be treated as Discard Eligible by the network. The measurement interval T is the time interval T in seconds or milliseconds over which the CIR, $B_C$, and $B_E$ are measured. T is not periodic, but rather a sliding window of fixed duration whose onset is triggered in the network by the receipt of the first frame of a given burst.

The mapping between the CIR and the four parameters of the 2-state MMPP model shown in FIG. 2 is not intuitive. The two transition rates can be utilized to determine the "cycle time" which might be defined as the average duration of the time spent on the "active" state plus the average duration of the time spend on the "idle" state. This cycle time (or multiple of cycle times) can be used to represent the measurement interval T. The number of bits transmitted during the measured interval T is then used to represent the $B_C$, which can be calculated from the four parameters of the model and the average frame size. Alternatively, $B_C$ can be measured directly while characterizing the traffic and while building the model. Since the methodology of the present invention can detect the beginning and end of each burst (whether in low or high activity state), it can also detect the beginning and the end of each cycle (i.e. one visit to the low activity state and one visit to the high activity state). Recognizing cycle boundaries, it is a matter of adding up the frame sizes received during a cycle to calculate the $B_C$. Once T and $B_C$ are determined, CIR can be obtained by dividing $B_C$ by T.

Figure 8:
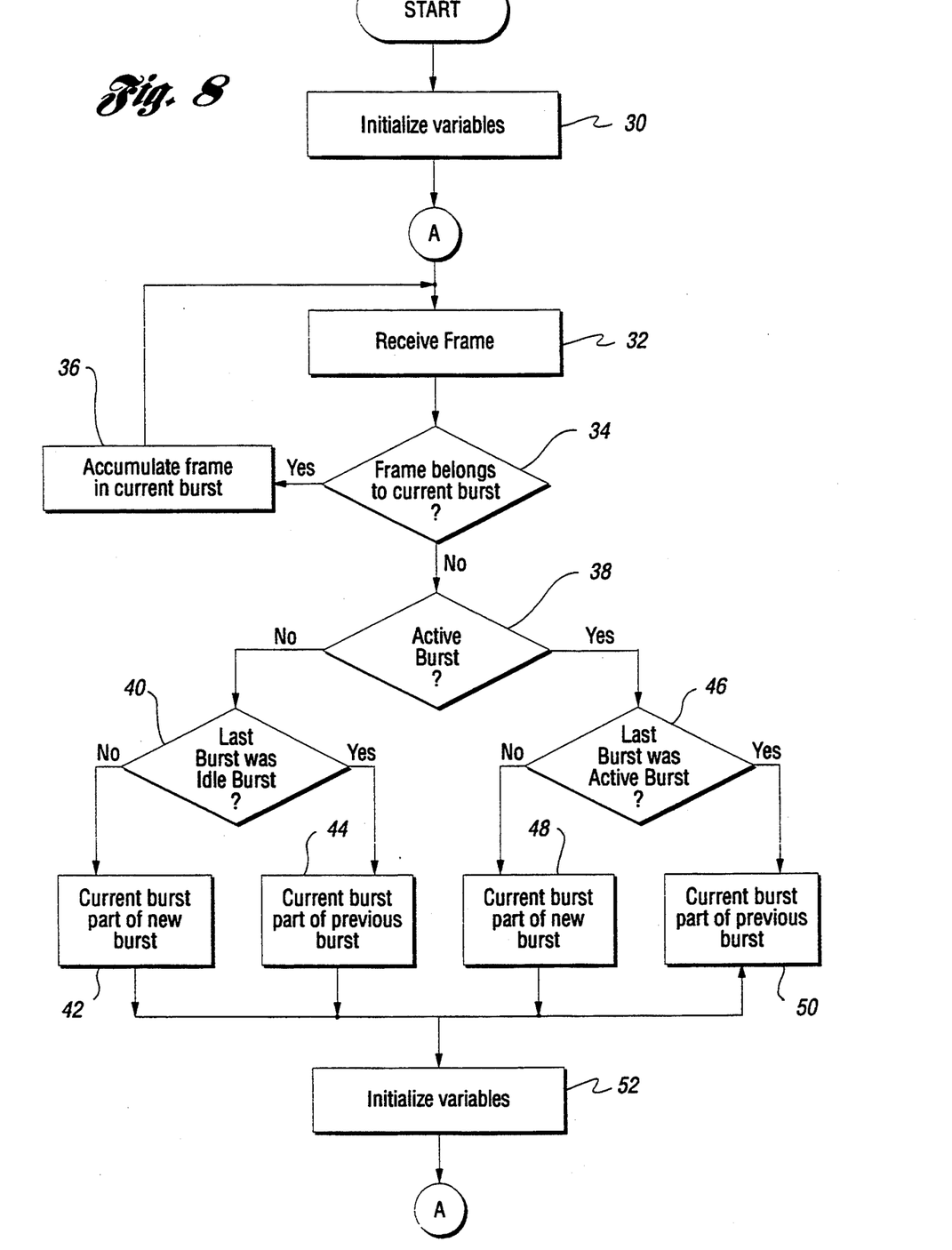
FIG. 8 illustrates a flowchart detailing burstiness analysis according to one aspect of the present invention.

Referring now to FIG. 8, there is shown a flowchart detailing burstiness analysis. The methodology shown in FIG. 8 can be separated into two general phases: phase 1 in which either a burst is constructed from an incoming stream of frames or a decision is made whether a newly arrived frame belongs to a current burst; and phase 2 in which a decision is made whether the current burst is active or inactive.

With continuing reference to FIG. 8, at step 30 variables are initialized to either zero or some predetermined value. At step 32, the workstation receives a frame from the incoming stream of frames and at step 34 determines whether the frame belongs to the current burst or represents part of a new burst, utilizing the test methodology described in greater detail above. If the received frame belongs to the current burst, that frame is accumulated as part of the current burst as step 36 and control flow returns to step 32 as shown. If, however, the received frame does not belong to the current burst, the nature of the current burst is identified at step 38. That is, at step 38 it is determined whether the current burst is an active burst (belonging to the active state) or an idle burst (belonging to the idle state), based on packet interarrival time.

As shown in FIG. 8, if the current burst is deemed inactive, at step 40 the workstation determines whether the last burst was an idle burst. Depending on the result, the current burst is either considered part of a new burst (step 42) or considered part of the previous burst (step 44). That is, at step 42 the last burst is considered to be last in the series of one or more consecutive active bursts and the current burst is the first in the series of one or more consecutive idle bursts, and at step 44 the current burst is added to the previous burst to form a bigger burst. At steps 42 and 44, associated statistics, such as number of packets per burst and the average and standard deviation of packets interarrival time, are also updated. Thereafter, variables are initialized at step 52 and control flow returns to point A as shown. If, however, the current burst is deemed active at step 38, at step 46 the workstation determines whether the last burst was an active burst. Depending on the result, the current burst is either considered part of a new burst (step 48) or considered part of the previous burst (step 50). That is, at step 48 the last burst is considered to be last in the series of one or more consecutive idle bursts and the current burst is the first in the series of one or more consecutive active bursts, and at step 50 the current burst is added to the previous burst to form a bigger burst. At steps 48 and 50, associated statistics are also updated. Thereafter, variables are initialized at step 52 and control flow returns to point A as shown.

In summary, the above discussion provided an in-depth analysis of the burstiness phenomenon that characterizes the traffic on data networks. Several widely used methods for measuring and characterizing bursty traffic were reviewed and the coefficient of variation and the 2-state MMPP were identified as means for measuring burstiness and modeling bursty traffic, respectively, according to the present invention.

The present invention provides a methodology which is based on a test of hypothesis technique to analyze the burstiness of the traffic and to report the results in real-time, making them available to network administrators and network management systems for the purposes of, for example, sizing the network. This algorithm assists in the understanding of the burstiness phenomenon on data communications networks and the quantification of the effect of traffic burstiness on network performance. Of course, although the above discussion focused on the present invention as developed for a 2-state MMPP, it has applicability to characterizing traffic based on an n-state MMPP.

Finally, the methodology of the present invention was validated through its ability to reconstruct traffic originally generated with known characteristics. It was shown that for bursty traffic, the characteristics of the reconstructed loads are close to those of the original loads. The methodology was also shown for use in characterizing the traffic from an operational LAN.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A method, for use with a communications network, for measuring and analyzing the burstiness of network traffic which includes at least one data burst, each data burst including a plurality of data packets travelling over the network, each data packet having an associated interarrival time upon arrival at the network, the method comprising:

determining a ratio of a first packet interarrival time and a second packet interarrival time, the first packet interarrival time being associated with a first data packet belonging to the at least one data burst, the second packet interarrival time being associated with a second data packet, the data packets consecutively arriving at the network;

comparing the ratio of the interarrival times to at least one predetermined constant; and determining whether the second data packet belongs to the at least one data burst based on the comparison.

2. The method of claim 1 further comprising accumulating the second data packet with a data burst based on the comparison.

3. The method of claim 2 wherein the ratio of the interarrival times is represented by R and the at least one predetermined constant is represented by C, the method further comprising accumulating the second data packet with the at least one data burst if $1/C \leq R \leq C$.

4. A method, for use with a communications network, for measuring and analyzing the burstiness of network traffic which includes at least one data burst, each data burst including a stream of data packets travelling over the network, the method comprising:

(a) receiving a first data packet of the at least one data burst for travel over the network, the first data packet having an associated first packet interarrival time;

(b) consecutively receiving a second data packet for travel over the network, the second data packet having an associated second packet interarrival time;

(c) determining the ratio of the second packet interarrival time to the first packet interarrival time;

(d) comparing the ratio of the second packet interarrival time and first packet interarrival time to at least one predetermined constant;

(e) determining whether the second data packet belongs to the at least one data burst based on the comparison; and (f) accumulating the second data packet with a data burst based on the comparison.

5. The method of claim 4 further comprising:

(g) repeating steps (a)–(f) at the arrival of data packets so as to group the stream of data packets into data bursts; and (h) constructing a burst profile of the network traffic as a series of data bursts rather than a series of packets.

6. The method of claim 4 wherein the ratio of the second packet interarrival time and the first packet interarrival time is represented by R and the at least one predetermined constant is represented by C, the method further comprising accumulating the second datapacket with the at least one data burst if $1/C \leq R \leq C$.

7. The method of claim 4 wherein the step of determining the ratio comprises:

determining the ratio of the second packet interarrival time to the average of n previous packet interarrival times of the at least one data burst so as to reduce the probability of erroneously grouping the second data packet with the at least one data burst.

8. The method of claim 7 further comprising:

(g) repeating steps (a)–(f) at the arrival of data packets so as to group the stream of data packets into data bursts; and (h) constructing a burst profile of the network traffic as a series of data bursts rather than a series of packets.

9. The method of claim 8 wherein the ratio of the second packet interarrival time and the first packet interarrival time is represented by R and the at least one predetermined constant is represented by C, the method further comprising accumulating the second data packet with the at least one data burst if $1/C \leq R \leq C$.

10. The method of claim 4 wherein the communications network is a frame relay network.

* * * * *